United States Patent
Ochi

(10) Patent No.: US 9,569,157 B2
(45) Date of Patent: Feb. 14, 2017

(54) NETWORK SYSTEM AND IMAGE FORMATION APPARATUS

(71) Applicant: Oki Data Corporation, Tokyo (JP)

(72) Inventor: Kengo Ochi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/824,126

(22) Filed: Aug. 12, 2015

(65) Prior Publication Data

US 2016/0127576 A1 May 5, 2016

(30) Foreign Application Priority Data

Oct. 29, 2014 (JP) ................................. 2014-219957

(51) Int. Cl.
G06F 3/12 (2006.01)
H04L 29/08 (2006.01)

(52) U.S. Cl.
CPC ............. G06F 3/1287 (2013.01); G06F 3/121 (2013.01); G06F 3/1217 (2013.01); G06F 3/1234 (2013.01); G06F 3/1267 (2013.01); H04L 67/1002 (2013.01)

(58) Field of Classification Search
CPC ............ H04N 1/00204; H04N 1/00344; H04N 1/00018; H04N 2201/0094; G06F 3/1267; G06F 3/1234; G06F 3/121; G06F 3/1217; G06F 3/1287; H04L 67/10
See application file for complete search history.

(56) References Cited

U.S. PATENT DOCUMENTS

2013/0258387 A1* 10/2013 Hashimoto ........ G06K 15/4045
358/1.14
2014/0258709 A1* 9/2014 Takeda ................ H04L 63/0823
713/156

FOREIGN PATENT DOCUMENTS

JP 2005-094444 A 4/2005

* cited by examiner

Primary Examiner — John Wallace
Assistant Examiner — Darryl V Dottin
(74) Attorney, Agent, or Firm — Mots Law, PLLC

(57) ABSTRACT

An image formation apparatus includes: a controller configured to control apparatus operation; and an analyzer configured to analyze maintenance information depending on the apparatus when an event requiring maintenance occurs in the apparatus. The maintenance information includes solutions to the event requiring the maintenance. The analyzer determines the order of application of the solutions to the apparatus. The controller controls the apparatus operation based on the order of application of the solutions determined as a result of the analysis by the analyzer.

12 Claims, 13 Drawing Sheets

FIG. 8

| SERIAL NUMBER | USERNAME | ORGANIZATION | NUMBER OF USERS | HISTORY INFORMATION |
|---|---|---|---|---|
| PRN001-123456 | Yamada Taro | SOLE PRORIETOR BUSINESS | 5 USERS | N/A |
| PRN001-987654 | Yamamoto Ichiro | 1000-MEMBER WORKFORCE | 100 USERS | JANUARY 30, 2013. CHANGED SCAN-TO-FOLDER ADDRESS FROM IP ADDRESS TO HOSTNAME. RECOMMENDED DNS SERVER SETTING. |

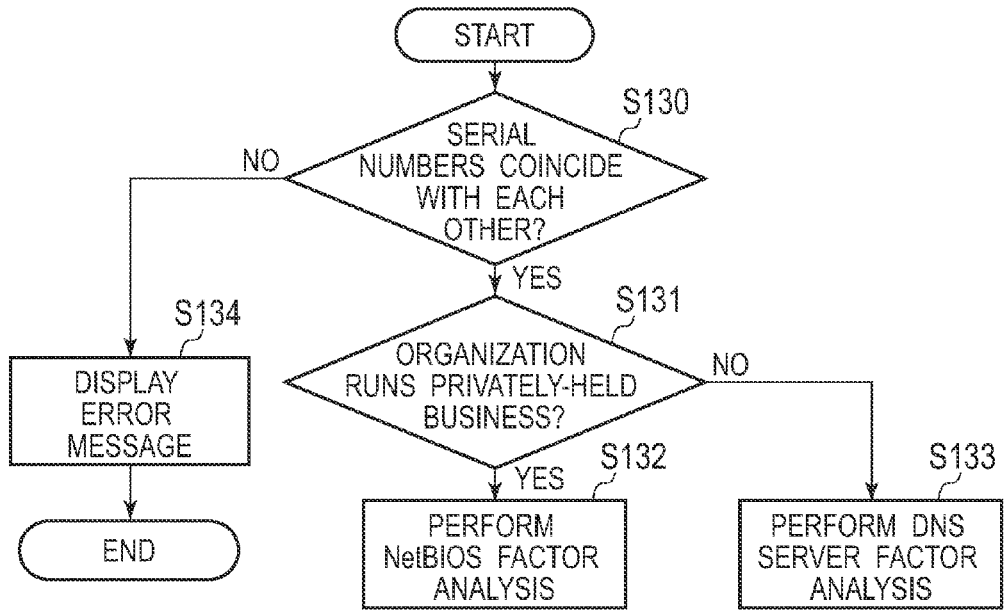

```
[Setting]
Serial Number.PRN001-123456
IP Address: 192.168.100.100
Subnet Mask:
Default Gateway:
DNS primary:192.168.100.200
DNS secondary: 0.0.0.0
WINS primary: 192.168.100.210
WINS secondary: 0.0.0.0
ScanToFolder Taget: ¥¥TEST¥ scan
User name: yamada
Password: #112azaa#

[Log]
05 / 06 / 2014 11:00'00     ScanToFolder Start
05 / 06 / 2014 11:00'00     DNS: NameResolveError: No Such Name
05 / 06 / 2014 11:00'01     WINS: NameResolveError: No Such Name
05 / 06 / 2014 11:00'10     NetBIOS: NameResolveError: No Such Name
05 / 06 / 2014 11:00'11     ScanToFolder Fail
```

NETWORK SYSTEM AND IMAGE FORMATION APPARATUS

CROSS REFERENCE TO RELATED APPLICATIONS

This application claims priority based on 35 USC 119 from prior Japanese Patent Application No. 2014-219957 filed on Oct. 29, 2014, entitled "NETWORK SYSTEM AND IMAGE FORMATION APPARATUS", the entire contents of which are incorporated herein by reference.

BACKGROUND OF THE INVENTION

1. Field of the Invention

This disclosure relates to a network system and an image formation apparatus.

2. Description of Related Art

There has been known a conventional image formation apparatus capable of storing image data, generated by reading an original, into a shared folder on an information processor, such as a computer, connected to the image formation apparatus via a network.

Japanese Patent Application Publication No. 2005-94444 describes a scanner which is an image formation apparatus and allows a user without being aware of the state of a computer designated as a destination to surely send scan data as image data to the computer and to store the scanned data into the computer.

SUMMARY OF THE INVENTION

However, in a case where, for example, the image data fails to be stored into the shared folder provided to the information processor, it is not easy for the user to identify the cause of the failure in the storage. If an event such as a connection failure requiring maintenance occurs in the image formation apparatus connected to the network as mentioned above, the troubleshooting to check understand the failure, identify the cause, and solve the problem requires a user to do bothersome and time consuming things, including, for example, making an inquiry or sending a maintenance personal to a service call center offered by the manufacture of the image formation apparatus.

Nowadays, most image formation apparatuses are used by being connected to a network line, whether intranet or Internet, and multiple image formation apparatuses are always on the network. If a failure event occurs in any of the image formation apparatuses which are different in model numbers, operating environments and the like, a troubleshooting method suitable to the failed image formation apparatus is desired to be offered. In the described situation, however, no network system has been built which is capable of offering a troubleshooting method that can flexibly depend on and be applied to each image formation apparatus.

An embodiment of the invention is intended to provide a network system in a network to which image formation apparatuses are connected, the network system configured to be capable of offering a troubleshooting method depending on any of the image formation apparatuses when an image formation apparatus encounters an event requiring maintenance, such as a connection failure.

An aspect of the invention is a network system that includes: image formation apparatuses connected to a network; and a cloud server configured to transmit and receive information to and from the image formation apparatuses. Each of the image formation apparatuses includes: an apparatus information retainer configured to retain apparatus information; a transceiver configured to transmit the apparatus information to the cloud server, and to receive information from the cloud server; and a controller configured to control each apparatus operation based on information from the cloud server. The cloud server includes: a user information retainer configured to retain user information associated with each of the image formation apparatuses; and an analyzer configured, when an event requiring maintenance occurs in one of the image formation apparatuses, identify which one of the image formation apparatuses has the event requiring the maintenance occurred, and to transmit, to the identified image formation apparatus, maintenance information depending on the identified image formation apparatus. The controller controls the apparatus operation based on the maintenance information received from the cloud server.

Another aspect of the invention is an image formation apparatus that includes: a controller configured to control apparatus operation; and an analyzer configured to analyze maintenance information depending on the apparatus when an event requiring maintenance occurs in the apparatus. The maintenance information includes solutions to the event requiring the maintenance. The analyzer determines an order of application of the solutions to the apparatus. The controller controls the apparatus operation based on the order of application of the solutions determined as a result of the analysis by the analyzer.

According to an aspect(s) of the invention, even when an event requiring maintenance occurs in any of the image formation apparatuses connected to a network, a troubleshooting method depending on the image formation apparatus can be provided.

BRIEF DESCRIPTION OF THE DRAWINGS

FIG. 8 is a diagram for explaining user information which is retained in a user information retainer.

FIG. 9 is a flowchart for explaining a mode of a method in which an analyzer determines an order of the application of solutions.

FIG. 10 is a diagram for explaining an example of log information.

DETAILED DESCRIPTION OF THE EMBODIMENTS

Figure 1:
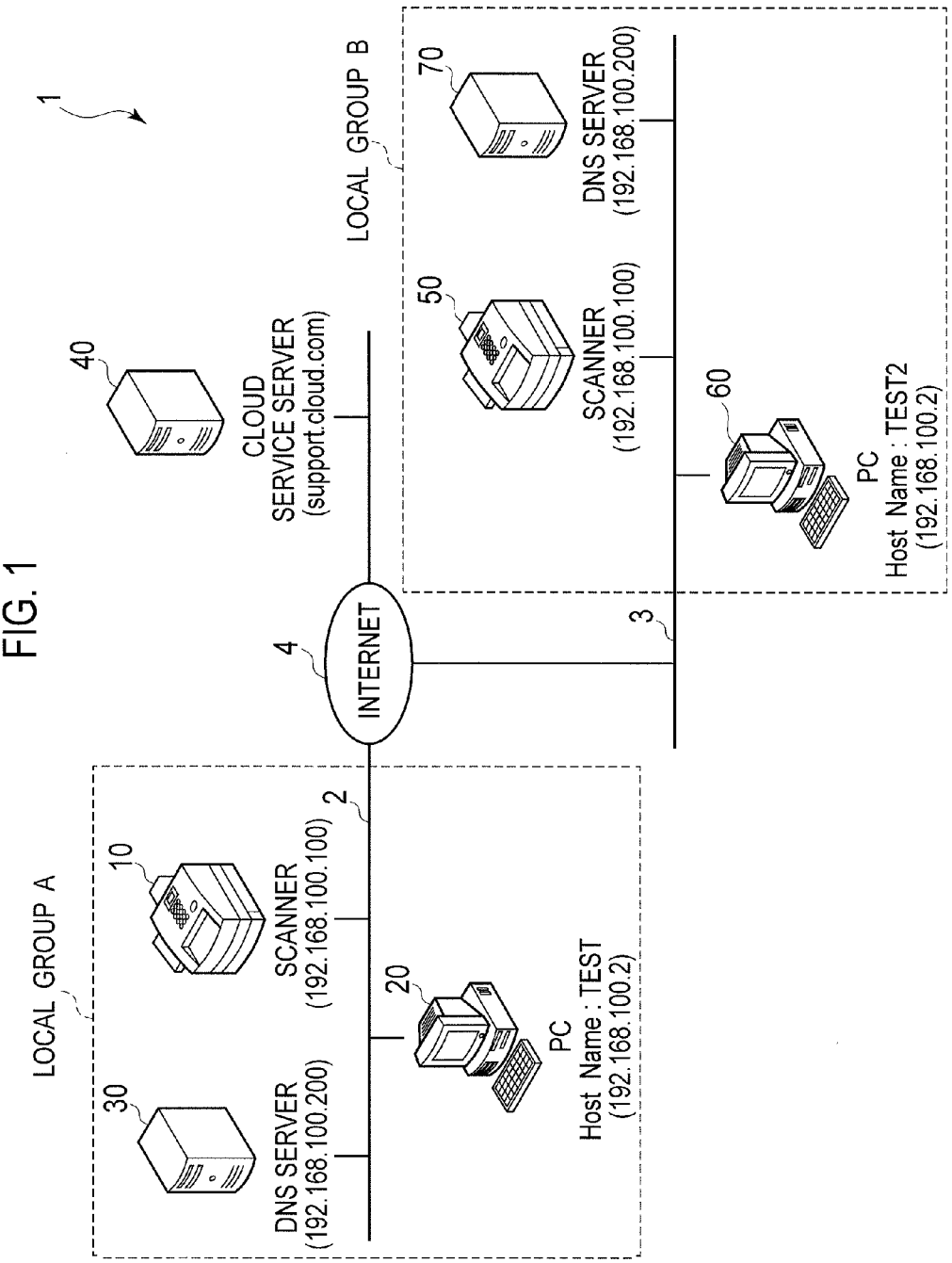
FIG. 1 is a diagram for explaining a connection topology of a network system of an embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Referring to the drawings, descriptions are hereinbelow provided for an embodiment of the invention. It should be noted that in the embodiment, an event in which a failure occurs due to a storage error while image data generated by reading an original using a scanner as an image formation apparatus is being stored into a shared folder provided to a PC (Personal Computer) as an information processor on the same network is cited as a maintenance-requiring event which occurs in an image formation apparatus connected to a network. However, the invention is not limited to what is described below. The invention may be modified as needed within a scope without departing from the gist of the invention.

FIG. 1 is a diagram for explaining a connection topology of network system 1 of the embodiment. For the sake of explanatory convenience, the embodiment is described citing an example where: local group A is a group as a sole proprietor business organization to which users of scanner 10 as an image formation apparatus belong; local group B is a group where of the members belonging to the group, approximately 100 members use scanner 50 as another image formation apparatus; and these local groups are connected to cloud service server 40 via Internet 4.

First of all, scanner 10 is configured to be connectable to Internet 4 using LAN (Local Area Network) cable 2 via a gateway. Furthermore, like scanner 10, PC 20 is connected to LAN cable 2. A shared folder accessible via the network is set in PC 20. The shared folder is accessible from scanner 10 as well. In addition, DNS (Domain Name System) server 30 configured to manage the association of a domain name such as a hostname with an IP address is connected to LAN cable 2. Scanner 10, PC 20 and DNS server 30 constitute local group A via LAN cable 2.

Like local group A, local group B is formed from scanner 50, PC 60, DNS server 70 and the like which are connected using LAN cable 3. Incidentally, scanner 50, PC 60 and DNS server 70 belonging to local group B may have the same configurations as scanner 10, PC 20 and DNS server 30 belonging to local group A, respectively. For this reason, the following descriptions are provided mainly for local group A.

Cloud service server 40 is configured to support a solution to the failure when a failure occurs on Internet 4. Cloud service server 40 is connected to local group A and local group B. Scanner 10 and scanner 50 are connectable to cloud service server 40 via Internet 4.

Figure 2:
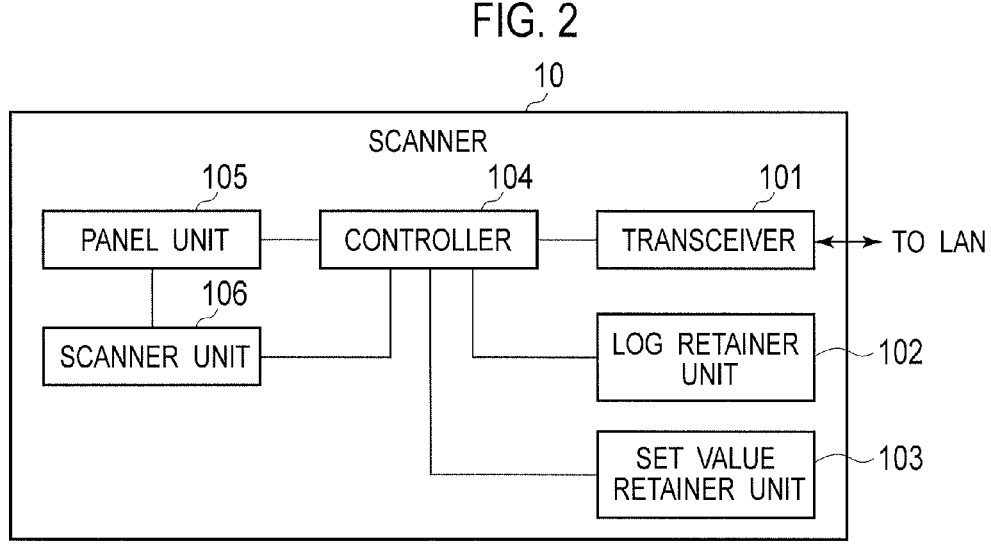
FIG. 2 is a schematic configuration diagram for explaining a configuration of a scanner of the embodiment.

FIG. 2 is a schematic configuration diagram for explaining the configuration of scanner 10. Scanner 10 includes transceiver 101, log retainer 102 as apparatus information retainer, set value retainer 103, controller 104, panel unit 105, and scanner unit 106.

Transceiver 101 includes an interface, such as a network card, which is connectable to LAN cable 2, and transmits and receives information.

Log retainer 102 includes, for example, a storage such as a rewritable flash memory, and retains log information on the history of the operation (such as reading originals, and transmitting the image data) of scanner 10.

Set value retainer 103 includes, for example, a storage such as a rewritable flash memory, and retains set values needed for the operation of scanner 10. In this respect, possible examples of the set values include an IP address assigned to scanner 10, a subnet mask, a default gateway address, an IP address of DNS server 30 used for hostname name resolution, an IP address of a WINS server, information on the path to the shared folder on PC 20 for the purpose of storing image data generated by scanner unit 106 into the shared folder, usernames and passwords for assess to the shared folder, and the like.

Controller 104 controls panel unit 105 and scanner unit 106 in order to instruct a failure analysis, and to read an original. Controller 104 also controls the transmission and reception of information to and from cloud service server 40 via transceiver 101. In addition, in order to solve the failure, controller 104 controls the apparatus operation based on maintenance information (described later) transmitted from cloud service server 40.

Figure 3:
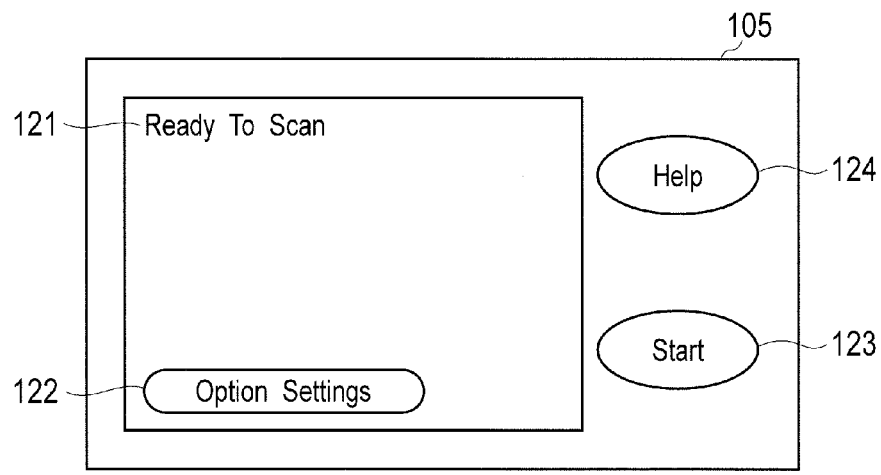
FIG. 3 is a diagram illustrating an example of a configuration of an operator panel as a panel unit.

Panel unit 105 is an operator panel which includes, for example, a display device such as an LCD (Liquid Crystal Display), and information input devices such as a touch panel and buttons, as well as which is configured to display apparatus information for the user, and to receive the input of manipulation information from the user. FIG. 3 is a diagram illustrating an example of a configuration of the operator panel as panel unit 105. Panel unit 105 includes touch panel 121, and is capable of displaying messages on a status of scanner 10 and the like. Touch panel 121 is capable of displaying button 122. In an example illustrated in FIG. 3, an "Option Settings" button is displayed as a button for receiving the input of detailed settings for reading the original. Button 123 is a start button for receiving an instruction for the start of reading the original. Button 124 is a help button for, when a failure occurs, receiving an instruction for the start of tracing the cause of the failure.

Scanner unit 106 includes at least a light source configured to emit light onto the original, a lens configured to collect light reflected off the original, and a photoelectric transducer device, such as a CCD (Charge Coupled Device), configured to receive the light collected by the lens, and to transduce the received light into an electric signal. Scanner unit 106 generates the image data based on a read image.

PC 20 includes: a CPU (Central Processing Unit) (not illustrated); memories such as a RAM (Random Access Memory) and a HDD (Hard Disk Drive); a main body section configured to house an information transmission and reception unit, such as a network card, which is connectable to LAN cable 2; input devices such as a keyboard; and a display device such as a liquid crystal device. PC 20 is configured to be capable of creating the shared folder, into which the image data transmitted from scanner 10 can be stored, based on a control by the operating system.

DNS server 30 can be formed, for example, from a PC, a dedicated hardware resource such as a network device, and a dedicated software resource. DNS server 30 is configured to associate an identifier (domain name) of the host with the IP address.

Figure 4:
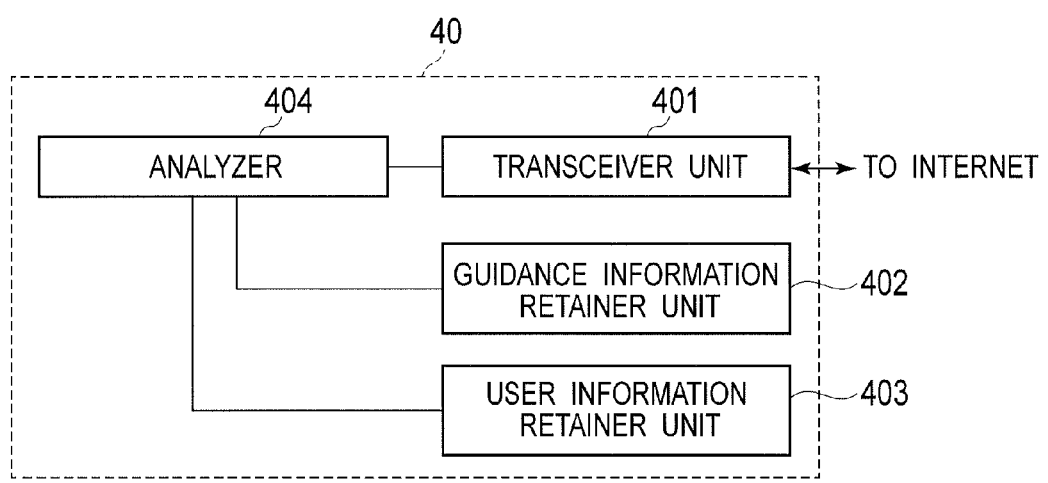
FIG. 4 is a schematic configuration diagram for explaining a configuration of a cloud service server of the embodiment.

Cloud service server 40 can be formed, for example, from a PC, a dedicated hardware resource such as a network device, and a dedicated software resource. In general, cloud service server 40 is a mode of the cloud service offered by the scanner manufacturer. As illustrated in FIG. 4, cloud service server 40 like this includes transceiver 401, guidance information retainer 402, user information retainer 403 and analyzer 404.

Transceiver 401 is configured to be connectable to Internet 4 via the LAN cable. Transceiver 401 transmits and receives information.

Guidance information retainer 402 includes, for example, a storage such as a rewritable flash memory. Based on the result of a failure analysis by analyzer 404, guidance information retainer 402 retains information to be provided to the scanner. Examples of the information retained in guidance information retainer 402 include messages and the like to be displayed on the panel unit included in the scanner. The information can be obtained from a server on the cloud other than cloud service server 40. The information reflects results updated based on failure examples and the like collected by the service call center, and the maintenance servicemen and servicewomen handling scanner failures.

User information retainer 403 includes, for example, a storage such as a rewritable flash memory. User information retainer 403 retains information on the user who purchases the scanner. An example of the information retained in user information retainer 403 is the user information registered by the user using a postcard, a telephone, a facsimile machine, and a Web site on the Internet provided by the scanner manufacturer. Examples of user information are the user's name, address, phone number, E-mail address and job; an organization (with a size) to which the user belongs; and how the user uses the scanner. Another example is the contents of inquiries made by the user to the service call center (including "the scanner cannot be connected to the network," and "image data cannot be stored into the shared folder after change of contracted providers).

Analyzer 404 analyzes the log information received via transceiver 401 based on the information retained in user information retainer 403 and guidance information retainer 402, and creates a command as a solution.

Next, descriptions are provided for the action of the embodiment. It should be noted that the following descriptions are provided on the assumption that: as a hostname, "TEST (IP address: 192.168.100.2)" is assigned to PC 20 above described; as a hostname, "support.cloud.com" is assigned to cloud service server 40; and as an IP address, "192.168.100.200" is assigned to DNS server 30.

Figure 5:
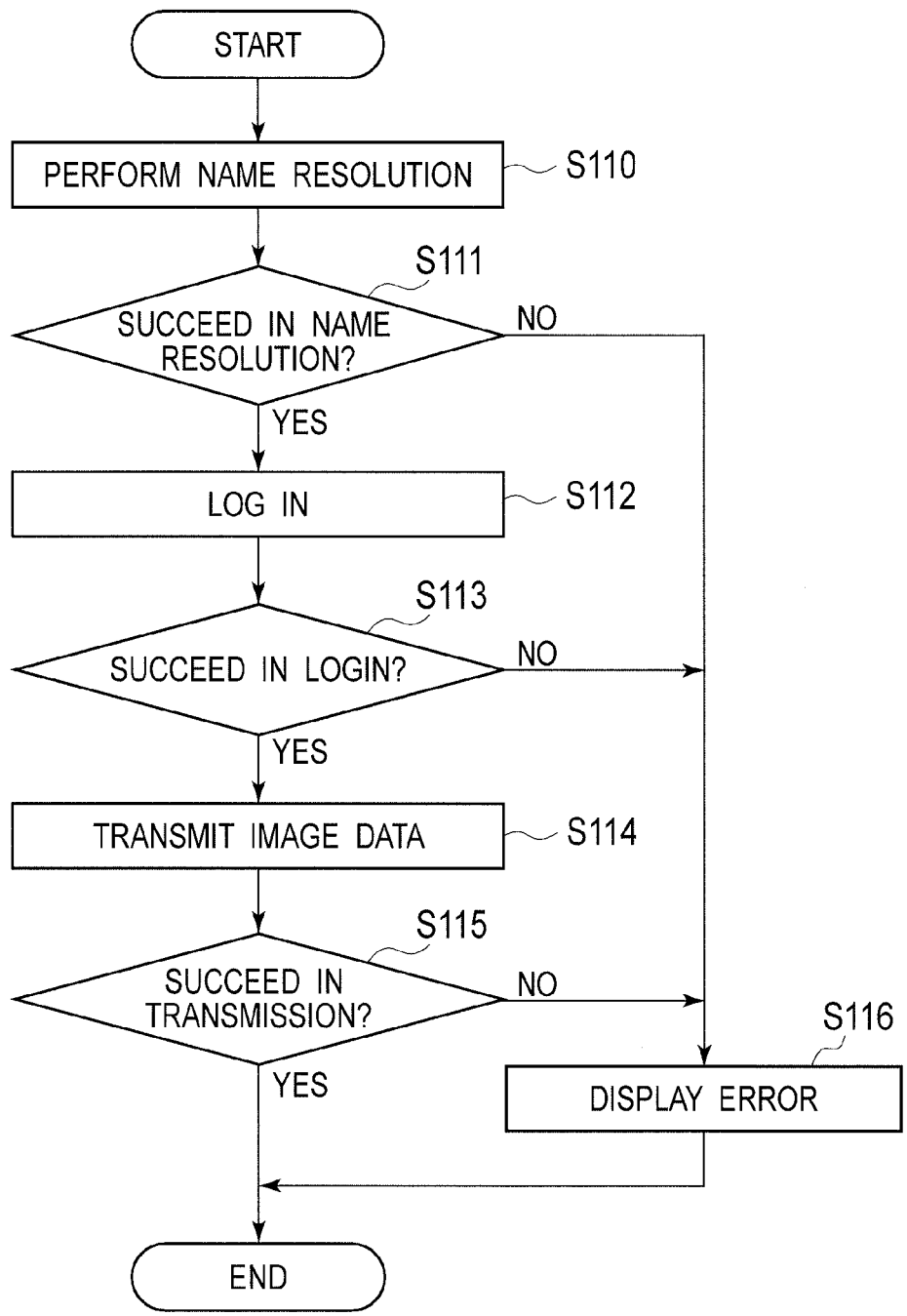
FIG. 5 is a flowchart for explaining a function for the scanner to store image data into a shared folder.

First of all, using the flowchart in FIG. 5, descriptions are provided for a function (scan-to-shared folder function) for scanner 10 of the embodiment to store the image data into the shared folder.

To begin with, controller 104 of scanner 10 makes scanner unit 106 read an image from the original by controlling scanner unit 106, and generates image data based on the read image. Thereafter, controller 104 performs name resolution on the hostname of the terminal (PC 20) on which the shared folder exists (step S110). A name resolution method of the embodiment is described later by citing the method performed by making inquiries to DNS server 30 and the WINS server (not illustrated), and the method performed by using the NetBIOS.

If as a result of the name resolution, controller 104 can obtain the IP address from the hostname (if YES in step S111), controller 104 makes transceiver 101 transmit the username and password for assess to the shared folder, the username and password being retained in set value retainer 103 to PC 20, and then tries a login (step S112). Once the login is successful (if YES in step S113), controller 104 makes transceiver 101 transmit the image data to PC 20 (step S114). Once the transmission of the image data is successful (step S115), controller 104 terminates this series of processes.

Meanwhile, if the name resolution fails, that is to say, controller 104 cannot obtain the IP address from the hostname, for example because the address of DNS server 30, the WINS server or the like is wrong or because it takes too long for the server to respond (if NO in step S111), controller 104 makes panel unit 105 display an error message, and terminates the process (step S116).

Furthermore, if the login is unsuccessful because the username or password is wrong when controller 104 tries to log in to PC 20, because no appropriate access permission is assigned to the shared folder, or for other reasons (if NO in step S113), controller 104 makes panel unit 105 display an error message, and terminates the process (step S116).

Moreover, if the image data transmission is unsuccessful because controller 104 has no permission to write to the shared holder, because the data size of the image data exceeds the size of the data which can be written to the shared folder, or for other reasons (if NO in step 115), controller 104 makes panel unit 105 display an error message, and terminates the process (step S116).

Figure 6:
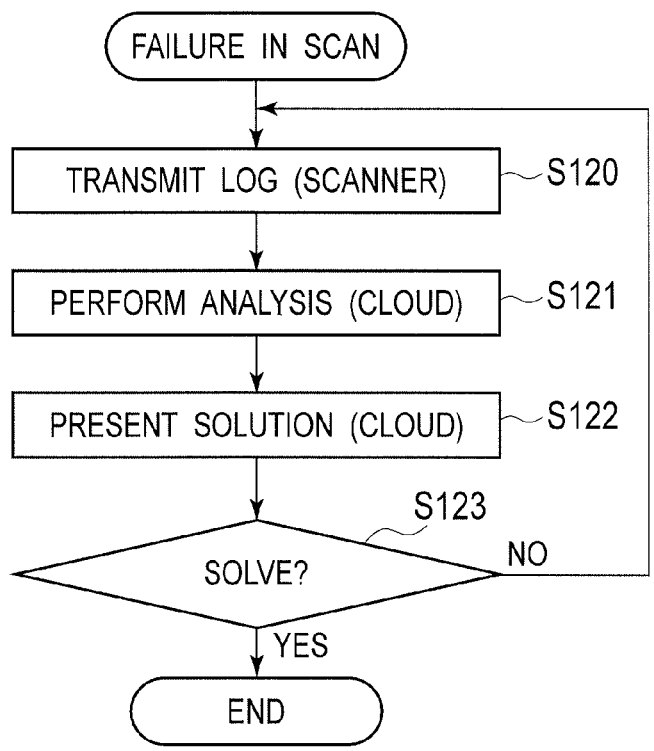
FIG. 6 is a flowchart for explaining how, in case of failure in the scan-to-shared folder function, the cloud service server solves the failure.

Next, using the flowchart in FIG. 6, descriptions are provided for how, in case of failure in the scan-to-share folder function, cloud service server 40 solves the failure.

First of all, if scanner 10 fails in the scan-to-shared folder function, the user presses button 124 (the help button) on panel unit 105. In response to the press of button 124, controller 104 connects transceiver 101 to Internet 4 using the set value retained in set value retainer 103, and transmits the log information retained in log retainer 102 to cloud service server 40 via transceiver 101 (step S120).

Figure 7:
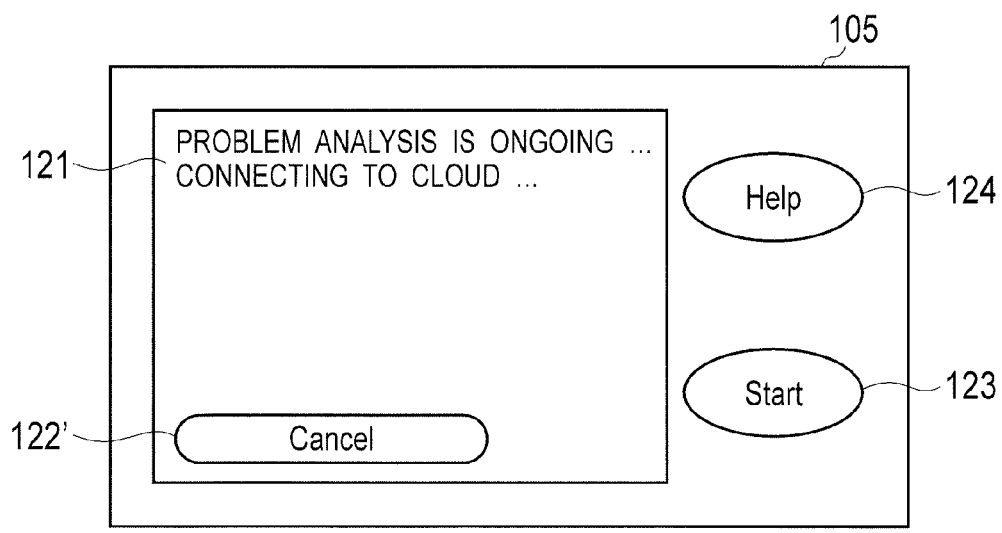
FIG. 7 is a diagram for explaining an example of a display on the panel unit.

In this respect, FIG. 7 illustrates an example of what panel unit 105 of scanner 10 displays during the transmission of the log information to cloud service server 40. In the example illustrated in FIG. 7, touch panel 121 in panel unit 105 displays a message that scanner 10 is connected to cloud service server 40 for the purpose of analyzing the cause of the failure in the scan-to-shared folder function, and button 122' displays a "Cancel Button" configured to receive an input of an instruction to cancel the analysis.

Meanwhile, analyzer 404 of cloud service server 40 which receives the log information via transceiver 401 starts to analyze the log information (step S121). Using information on a serial number as identification information included in the log information, analyzer 404 retrieves information on the owner of scanner 10 from the information retained in user information retainer 403, and performs the analysis using the retrieved information.

It should be noted that during the log information analysis, cloud service server 40 may perform the scan-to-shared folder function by: transmitting a command to scanner 10; and thereby changing the behavior of scanner 10.

Using a result of the analysis and the information retained in guidance information retainer 402, analyzer 404 presents solutions to scanner 10 (step S122). Examples of the solutions presented by analyzer 404 include: a change of the set value of scanner 10; a display of solutions on panel unit 105 of scanner 10 for the user; and a display of the result of the analysis on panel unit 105 of scanner 10.

Once the scan-to-shared folder function becomes successful as a result of solving the cause by the presentation of the solutions (if YES in step S123), analyzer 404 terminates the process. On the other hand, if the cause remains unsolved (if NO in step S123), analyzer 404 informs controller 104 of scanner 10 that the cause remains unsolved, and makes controller 104 restart the process with the transmission of the log information.

Here, using FIG. 8, descriptions are provided for the user information retained in user information retainer 403 of cloud service server 40. User information 160 of the embodiment includes: serial number 161 of each apparatus; username 162 of the owner of each scanner; classification 163 of each organization to which the users belong; the rough number 164 of users who use their scanner in each organization; history information 165 on inquiries made by the users in each organization to the service call center about their scanner.

Analyzer 404 of cloud service server 40 determines solutions to the failure and an order of the application of the solutions using the user information. FIG. 9 is a flowchart for explaining a mode of a method in which analyzer 404 determines the order of the application of the solutions.

If for example, scanner 10 belonging to local group A, whose serial number is "PRN001-123456," transmits the log information, analyzer 404 compares the serial number described in the transmitted log information with serial number 161 retained in user information 160.

If the two serial numbers coincide with each other (if YES in step S130), analyzer 404 refers to: classification 163 of the organization to which the users belong, which is included in user information 160; and rough number 164 of users of the scanner.

In the case of scanner 10, since number 164 of users of scanner 10 is approximately 5 and classification 163 of the organization is a sole proprietor business organization (if YES in step S131), analyzer 404 judges that scanner 10 is connected to a small-scale network, and determines to perform a NetBIOS factor analysis for scanner 10 assuming that NetBIOS is most likely to cause a failure in the small-scale network (step S132).

On the other hand, if scanner 50 belonging to local group B, whose serial number is "PRN001-987654," transmits the log information, analyzer 404 compares the serial number described in the transmitted log information with serial number 161 retained in user information 160.

If the two serial numbers coincide with each other (if YES in step S130), analyzer 404 refers to: classification 163 of the organization to which the users belong, which is included in user information 160; and rough number 164 of users of the scanner.

In the case of scanner 50, since number 164 of users of scanner 50 is approximately 100 and classification 163 of the organization is an organization with a 1000-member workforce (if NO in step S131), analyzer 404 judges that scanner 50 is connected to a large-scale network, and determines to perform a DNS server factor analysis for scanner 50 assuming that the DNS server is most likely to cause a failure in the large-scale network (step S133).

Meanwhile, if the serial number included in the transmitted log information does not coincide with the serial number described in user information 160 (if NO in step S130), analyzer 404 makes the panel unit of the scanner display an error message (step S134), and terminates the process.

FIG. 10 is a diagram illustrating an example of log information when scanner 10 whose serial number is "PRN001-123456" is unsuccessful in the scan-to-share folder function.

The log information of this example is formed from setting information (a part which begins with [Setting]) and a log information body (a part which begins with [Log]). What are described in the setting information are the serial number, IP address, subnet mask, and default gateway address; the IP addresses of the DNS server and the WINS server to be used for hostname resolution; the path information on the shared folder into which to store a scan result; and the username and password for access to the shared folder. Incidentally, for the password, things such as encryption in a specific mode need to be taken into consideration.

In the log information, each line describes what process is executed at what time. The log information of the example describes: a log of the execution of the scan-to-shared folder function; a log of a failure in DNS server name resolution; a log of a failure in WINS server name resolution; and a log of a failure in NetBIOS name resolution. The log information ends with the description of the information that the scan-to-shared folder function eventually fails.

As described above, upon receipt of the log information, analyzer 404 judges that scanner 10 is connected to the small-scale network by combining the serial number and user information 160 retained in user information retainer 403. Analyzer 404 tries to correct the failure by starting with a solution to the failure which is most likely to occur in the small-scale network.

Figure 11:
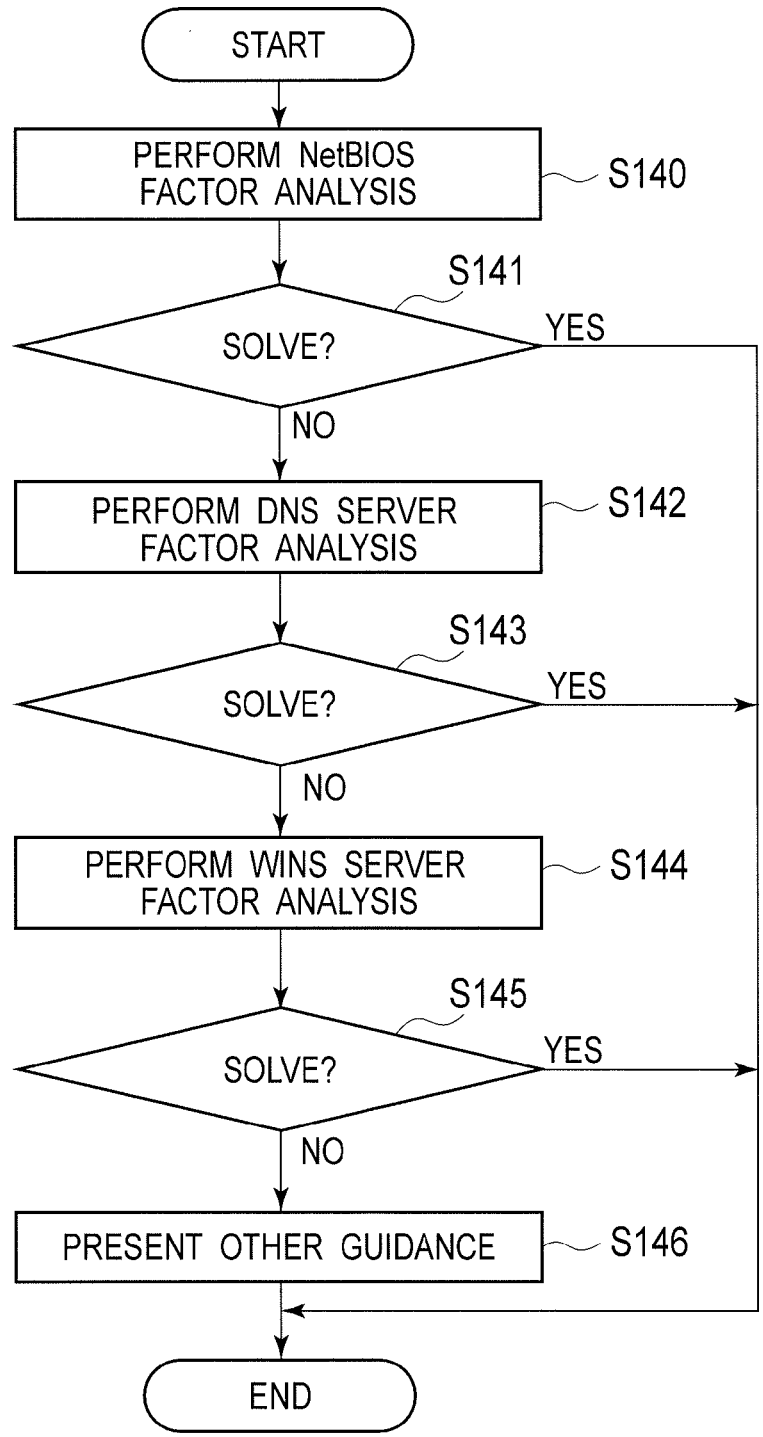
FIG. 11 is a flowchart for explaining a flow of the failure analysis which the analyzer performs when name resolution in a small-scale network fails.

FIG. 11 is a flowchart for explaining a flow of the failure analysis which analyzer 404 performs when the name resolution in a small-scale network fails.

Once through the process illustrated in FIG. 9, analyzer 404 determines to perform the NetBIOS factor analysis assuming that NetBIOS is most likely to cause a failure in the small-scale network. Analyzer 404 starts the NetBIOS factor analysis (step S140). If the failure in the NetBIOS name resolution is solved (if YES in step S141), analyzer 404 terminates the factor analysis, and makes the panel unit of the scanner display a message for recommending the user to perform a scanning operation using the scanner once again.

On the other hand, if the failure in the NetBIOS name resolution remains unsolved (if NO in step S141), analyzer 404 starts a DNS server factor analysis (step S142). If the failure in the DNS server name resolution is solved (if YES in step S143), analyzer 404 terminates the factor analysis, and makes the panel unit of the scanner display the message for recommending the user to perform a scanning operation using the scanner once again.

If the failure in the DNS server name resolution remains unsolved (if NO in step S143), analyzer 404 starts a WINS server factor analysis (step S144). If the failure in the WINS server name resolution is solved (if YES in step S145), analyzer 404 terminates the factor analysis, and makes the panel unit of the scanner display the message for recommending the user to perform a scanning operation using the scanner once again.

Figure 12:
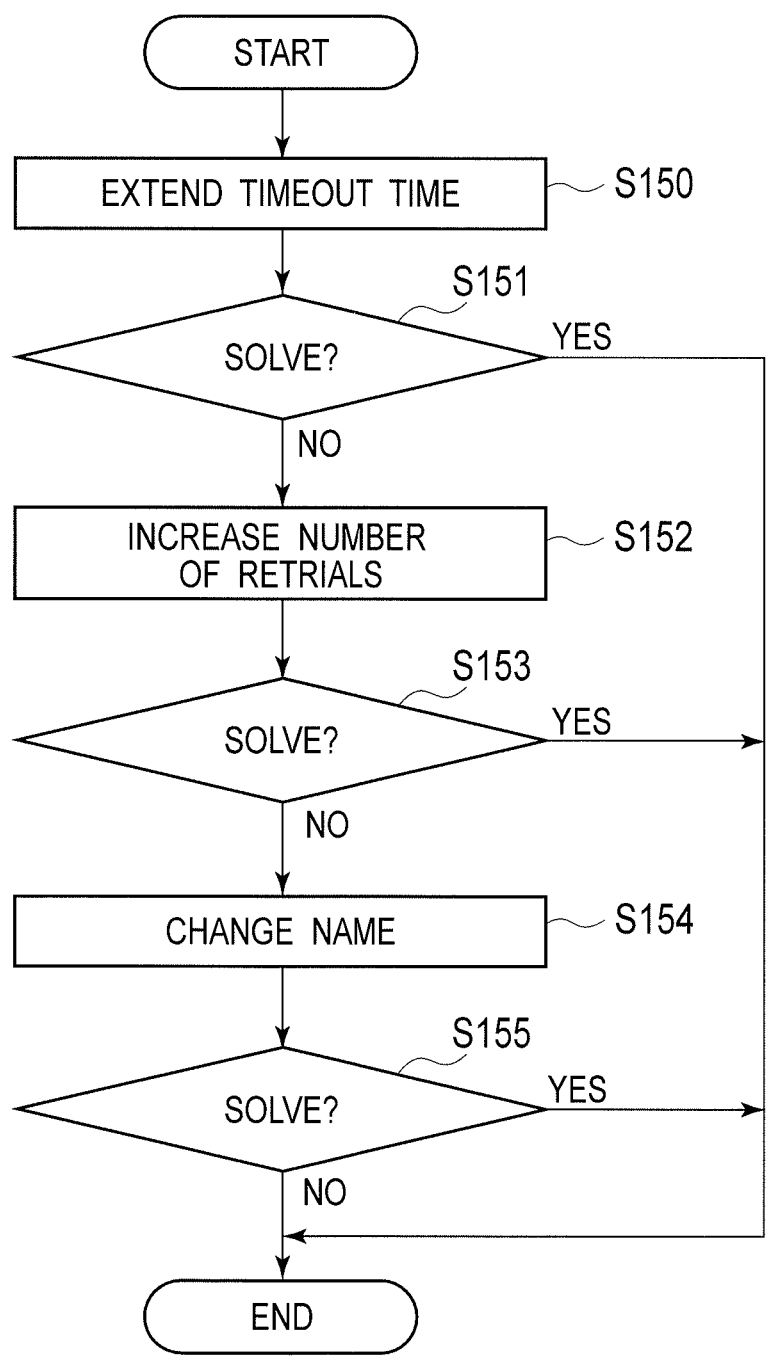
FIG. 12 is a flowchart for explaining a problem location identification process which is performed when NetBIOS (Network Basic Input/Output system) name resolution, DNS server name resolution and WINS (Windows Internet Name Service) server name resolution fail.

FIG. 12 is a flowchart for explaining a problem location identification process which is performed when all the NetBIOS name resolution, the DNS server name resolution and the WINS server name resolution fail.

First of all, analyzer 404 extends a wait time for waiting for a response to the name resolution to check whether or not the failure remains unsolved within the extended wait time (step S150). If the failure is solved (if YES in step S151), analyzer 404 sets the scanner for the extended wait time for waiting for the response, and terminates the problem location identification process.

If the failure remains unsolved within the extended wait time for waiting for the response (if NO in step S151), analyzer 404 increases the number of retries to check whether or not the failure remains unsolved during the increased number of retries (step S152). If the failure is solved (if YES in step S153), analyzer 404 sets the scanner for the increased number of retries, and terminates the problem location identification process.

If the failure remains unsolved during the increased number of retries (if NO in step S153), analyzer 404 changes the name to be used for the name resolution to check whether or not the failure still remains unsolved even using changed names (step S154). For example, the NetBIOS name resolution discriminates between a capital letter and a small letter for each of the letters in the hostname used for the NetBIOS. For this reason, analyzer 404 tries combinations of capital and small letters to check whether or not the failure in the name resolution remains unsolved. If the failure is solved (if YES in step S155), analyzer 404 sets the scanner for the correct changed name, and terminates the problem location identification process.

Figure 13:
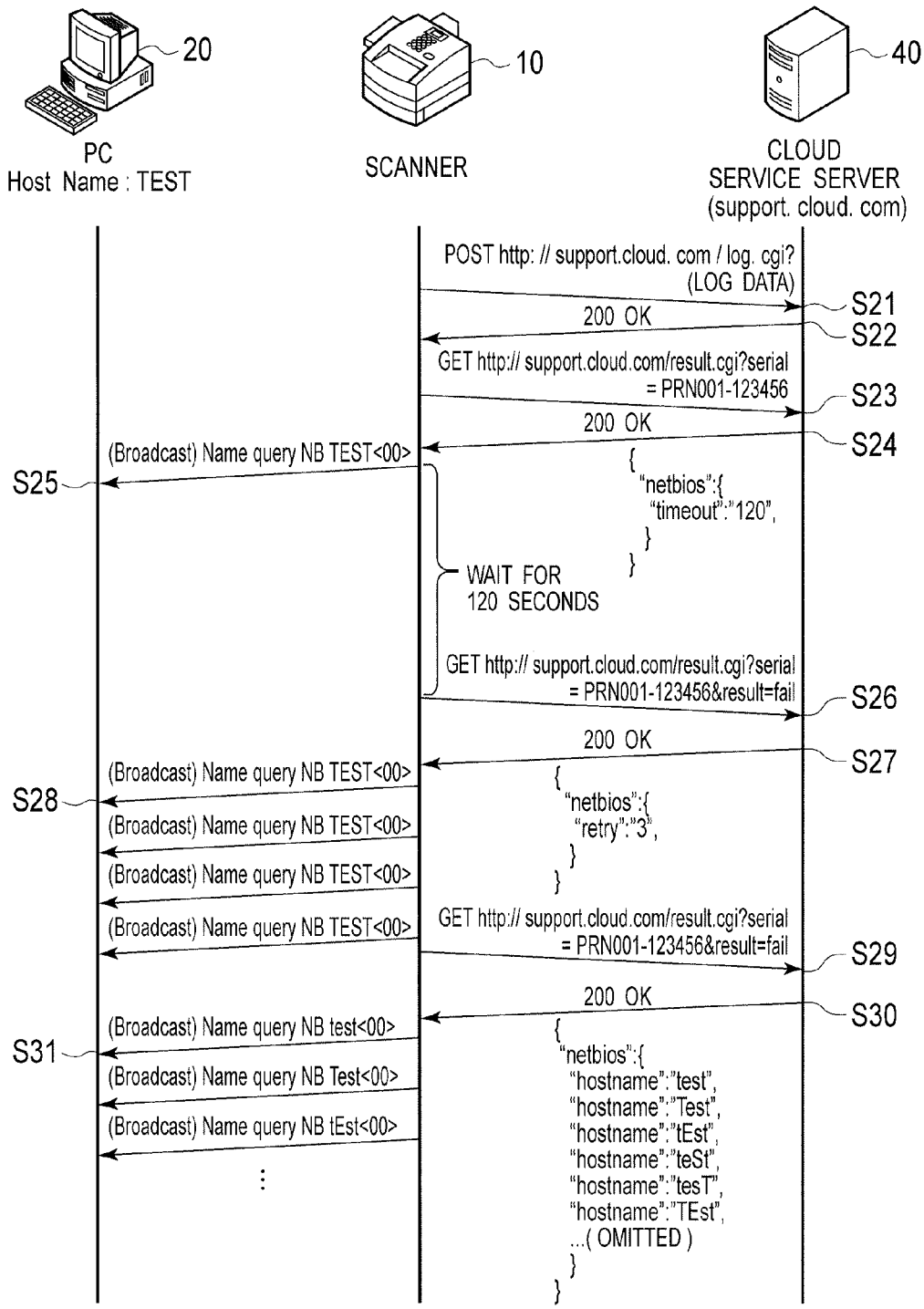
FIG. 13 is a sequence diagram for explaining an example of communications which are performed among the cloud service server, the scanner and a PC when the NetBIOS name resolution fails.

FIG. 13 is a sequence diagram for explaining an example of communications which are performed among cloud service server 40, scanner 10 and PC 20 when the NetBIOS name resolution fails.

First of all, if scanner 10 fails in the scan-to-shared folder function, the user presses button 124 (the help button) on panel unit 105. In response to the press of button 124, controller 104 connects transceiver 101 to Internet 4 using the set value retained in set value retainer 103, and transmits the log information retained in log retainer 102 to cloud service server 40 via transceiver 101.

Using the HTTP POST method, scanner 10 transmits the log information to http://support.cloud.com/log.cgi (step S21). Upon receipt of the log information via transceiver 401, cloud service server 40 responds to scanner 10 using a HTTP response code of "200 OK" (step S22).

Upon receipt of the response from cloud service server 40, scanner 10 transmits its own serial number to cloud service server 40, and accesses a URL at http://support.cloud.com/result.cgi?serial=PRN001-123456 using the HTTP GET method for the purpose of acquiring a result of an analysis by cloud service server 40 (step S23).
0]

In response to the GET method, cloud service server 40 transmits a command as a solution showing an action for scanner 10 to perform, together with the HTTP response code of "200 OK" (step S24). In this example, {"netbios": {"timeout":"120",}} indicates that analyzer 404 of cloud service server 40 determines to change the wait time for waiting for a response from the NetBIOS to 120 seconds.

Upon receipt of the response from cloud service server 40, scanner 10 performs the NetBIOS name resolution. To put it concretely, scanner 10 broadcasts a NetBIOS command of "Name query NB TEST<00>" to PC 20 (step S25).

If no response comes from PC 20 to scanner 10 in 120 seconds, the instruction from cloud service server 40 is unsuccessful. For this reason, scanner 10 transmits its own serial number and information on the result of the instruction to cloud service server 40, and accesses a URL at http://support.cloud.com/result.cgi?serial=PRN001-123456&result=fail using the HTTP GET method for the purpose of acquiring a result of the next analysis by cloud service server 40 (step S26).

In response to the GET method, cloud service server 40 transmits a command as a solution showing another action for scanner 10 to perform, together with the HTTP response code of "200 OK" (step S27). In this example, {"netbios": {"retry":"3",}} indicates that analyzer 404 of cloud service server 40 determines to change the number of retries using the NetBIOS to 3.

Upon receipt of the response from cloud service server 40, scanner 10 performs the NetBIOS name resolution. If no response comes from PC 20 to scanner 10, scanner 10 repeats the name resolution until the third retrial turns out to be unsuccessful. It should be noted that although the NetBIOS commands to be used for the retries are the same, actions for the respective retries are different (step S28).

If no response comes from PC 20 to scanner 10 despite the three retries, the instruction from cloud service server 40 is unsuccessful. For this reason, scanner 10 transmits its own serial number and information on the result of the instruction to cloud service server 40, and accesses the URL at http://support.cloud.com/result.cgi?serial=PRN001-123456&result=fail using the HTTP GET method for the purpose of acquiring a result of the next analysis by cloud service server 40 (step S29).

In response to the GET method, cloud service server 40 transmits a command as a solution showing yet another action for scanner 10 to perform, together with the HTTP response code of "200 OK" (step S27). In this example,

```
{
"netbios":{
  "hostname":"test",
  "hostname":"Test",
  "hostname":"tEst",
  "hostname":"teSt",
  "hostname":"tesT",
  "hostname":"TEst",
  ... (omitted)
``` indicates that analyzer 404 of cloud service server 40 determines to perform the NetBIOS name resolution by changing the name.

Upon receipt of the response from cloud service server 40, scanner 10 tries to perform the NetBIOS name resolution by using the presented names (step S31).

Figure 14:
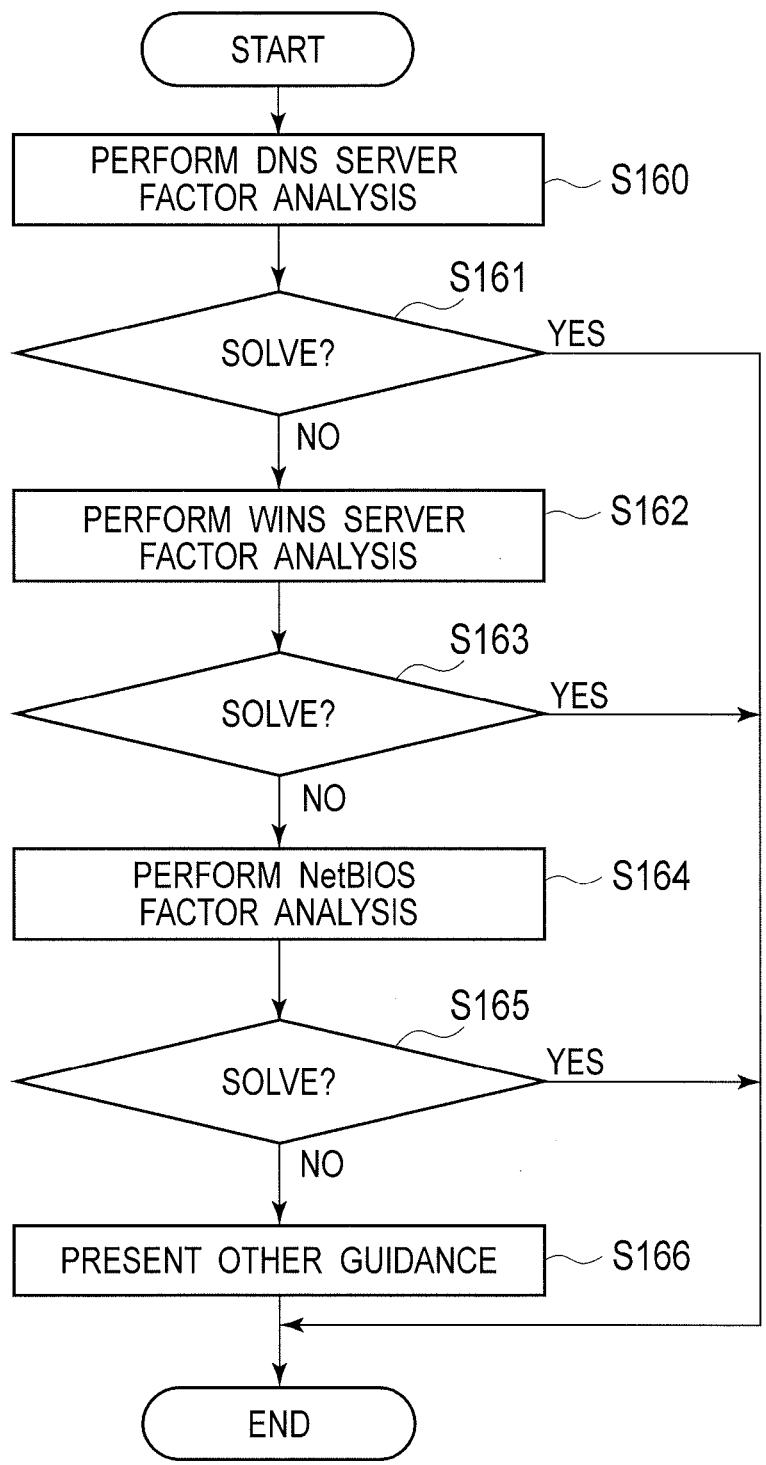
FIG. 14 is a flowchart for explaining a flow of the failure analysis which the analyzer performs when the name resolution in a large-scale network fails.

FIG. 14 is a flowchart for explaining the flow of failure analysis which analyzer 404 performs when the name resolution in a large-scale network fails.

Once through the process illustrated in FIG. 9, analyzer 404 determines to perform the DNS server factor analysis assuming that the DNS server is most likely to cause a failure in the large-scale network. Analyzer 404 starts a DNS server factor analysis (step S160). If the failure in the DNS server name resolution is solved (if YES in step S161), analyzer 404 terminates the factor analysis, and makes the panel unit of the scanner display a message for recommending the user to perform a scanning operation using the scanner once again.

On the other hand, if the failure in the DNS server name resolution remains unsolved (if NO in step S161), analyzer 404 starts a WINS server factor analysis (step S162). If the failure in the WINS server name resolution is solved (if YES in step S163), analyzer 404 terminates the factor analysis, and makes the panel unit of the scanner display the message for recommending the user to perform a scanning operation using the scanner once again.

If the failure in the WINS server name resolution remains unsolved (if NO in step S163), analyzer 404 starts a NetBIOS factor analysis (step S164). If the failure in the NetBIOS name resolution is solved (if YES in step S165), analyzer 404 terminates the factor analysis, and makes the panel unit of the scanner display the message for recommending the user to perform a scanning operation using the scanner once again.

If the failure in the NetBIOS name resolution remains unsolved, analyzer 404 makes the panel unit of the scanner display a message for recommending the user to review the setting information, such as checking the IP address of the server (step S166).

Figure 15:
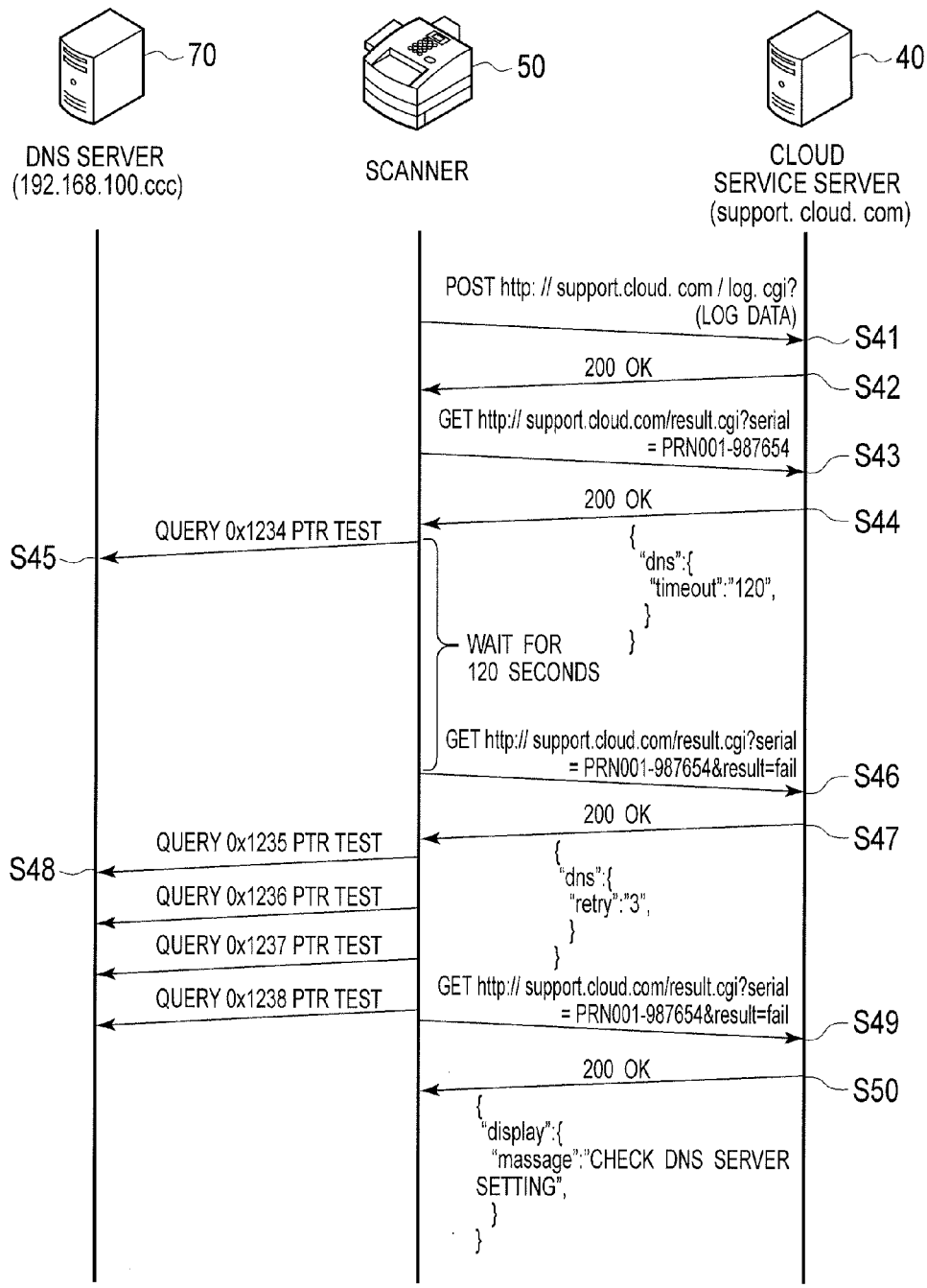
FIG. 15 is a sequence diagram for explaining an example of communications which are performed among the cloud service server, the scanner and the DNS server when the DNS server name resolution fails.

FIG. 15 is a sequence diagram for explaining an example of communications which are performed among cloud service server 40, scanner 50 and DNS server 70 when the DNS server name resolution fails. Incidentally, descriptions for scanner 50 are provided by assigning the same reference signs to components of scanner 50, which are the same as those of scanner 10.

First of all, if scanner 50 fails in the scan-to-shared folder function, the user presses button 124 (the help button) on panel unit 105. In response to the press of button 124, controller 104 connects transceiver 101 to Internet 4 using the set value retained in set value retainer 103, and transmits the log information retained in log retainer 102 to cloud service server 40 via transceiver 101.

Using the HTTP POST method, scanner 50 transmits the log information to http://support.cloud.com/log.cgi (step S41). Upon receipt of the log information via transceiver 401, cloud service server 40 responds to scanner 50 using a HTTP response code of "200 OK" (step S22).

Upon receipt of the response from cloud service server 40, scanner 50 transmits its own serial number to cloud service server 40, and accesses a URL at http://support.cloud.com/result.cgi?serial=PRN001-987654 using the HTTP GET method for the purpose of acquiring a result of an analysis by cloud service server 40 (step S43).

In response to the GET method, cloud service server 40 transmits a command as a solution showing an action for scanner 50 to perform, together with the HTTP response code of "200 OK" (step S44). In this example,

```
{
  "dns":{
    "timeout":"120",
  }
}
``` indicates that analyzer 404 of cloud service server 40 determines to change the wait time for waiting for a response from DNS server 70 to 120 seconds.

Upon receipt of the response from cloud service server 40, scanner 50 performs the name resolution on DNS server 70. To put it concretely, scanner 50 transmits an inquiry "QUERY 0x1234PTR TEST2" to DNS server 70 (step S45). It should be noted that: "0x1234" included in the inquiry is a code which the inquirer assigns to the inquiry in order to avoid repeating the same inquiry in the communications between the inquirer and DNS server 70; and each time the inquirer makes a new inquiry, the inquirer assigns a different code to the new inquiry. "TEST2" is a hostname assigned to PC 60 in local group B.

If no response comes from DNS server 70 to scanner 50 in 120 seconds, the instruction from cloud service server 40 is unsuccessful. For this reason, scanner 50 transmits its own serial number and information on the result of the instruction to cloud service server 40, and accesses a URL at http://support.cloud.com/result.cgi?serial=PRN001-987654&result=fail using the HTTP GET method for the purpose of acquiring a result of the next analysis by cloud service server 40 (step S46).

In response to the GET method, cloud service server 40 transmits a command as a solution showing another action for scanner 50 to perform, together with the HTTP response code of "200 OK" (step S47). In this example,

```
{
  "dns":{
    "retry":"3",
  }
}
``` indicates that analyzer 404 of cloud service server 40 determines to change the number of retries on DNS server 70 to 3.

Upon receipt of the response from cloud service server 40, scanner 50 performs the name resolution on DNS server 70. If no response comes from DNS server 70 to scanner 50, scanner 50 repeats the name resolution until the third retrial turns out to be unsuccessful. It should be noted that although the commands to DNS server 70 to be used for the retries are the same, actions for the respective retries are different (step S48).

If no response comes from DNS server 70 to scanner 50 despite the three retries, the instruction from cloud service server 40 is unsuccessful. For this reason, scanner 50 transmits its own serial number and information on the result of the instruction to cloud service server 40, and accesses the URL at http://support.cloud.com/result.cgi?serial=PRN001-987654&result=fail using the HTTP GET method for the purpose of acquiring a result of the next analysis by cloud service server 40 (step S49).

In response to the GET method, cloud service server 40 transmits a command as a solution showing yet another action for scanner 50 to perform, together with the HTTP response code of "200 OK" (step S50). In this example,

```
{
  "display":{
    "message":"check DNS server setting",
  }
}
``` indicates that analyzer 404 of cloud service server 40 determines to make panel unit 105 of scanner 50 display a message.

Figure 16:
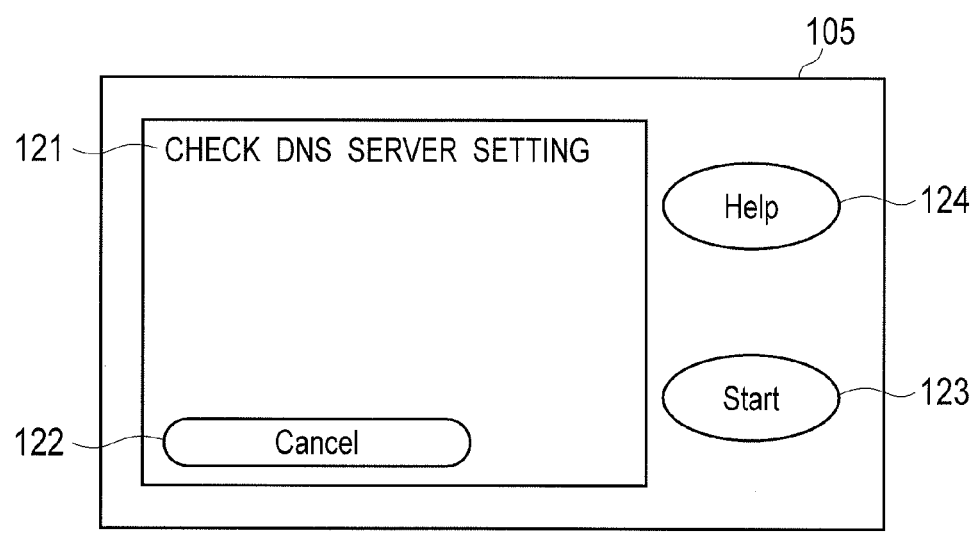
FIG. 16 is a diagram for explaining an example of a display on a panel unit.

In accordance with the command, panel unit 105 of scanner 50 displays the message as illustrated in FIG. 16, for example.

As described above, according to the embodiment, it is possible to provide a network system in a network to which image formation apparatuses are connected, the network system configured to be capable of offering a troubleshooting method depending on any of the image formation apparatuses when any one of the image formation apparatuses encounters an event requiring maintenance, such as a failure in the function of storing the image data into the shared folder due to the defective network connection.

It should be noted that although the defective network connection is cited as the maintenance-requiring event in the descriptions provided for the embodiment, the invention is not limited to this case. In other words, in a case where, for example, the image formation apparatuses are printers, the invention may be such that: for each printer, information on the consumption of supplies, such as toner, is stored into the history information retained in the user information retainer included in the cloud service server; and depending on how the printer accesses the cloud service server, information on an optimum schedule of supply replenishment is provided to the printer.

Furthermore, although the scanners are cited as the image formation apparatuses in the descriptions provided for the embodiment, the invention is applicable to copy machines, multifunction printers, facsimile machines and the like as well.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A network system comprising:
   image formation apparatuses connected to a cloud server through a network; the cloud server configured to transmit and receive information to and from the image formation apparatuses, wherein
   each of the image formation apparatuses includes
      an apparatus information storage that retains apparatus information for identifying the image formation apparatus,
      a transceiver that transmits the apparatus information to the cloud server, and that receives information from the cloud server, and
      a controller that controls apparatus operation based on information from the cloud server,
   the cloud server includes
      an analyzer that executes a first maintenance processing for maintenance to each of the image formation apparatuses and a second maintenance processing for maintenance to each of the image formation apparatuses: wherein
      in the first maintenance processing, the analyzer transmits first maintenance information to the image formation apparatus; and
      in the second maintenance processing, the analyzer transmits second maintenance information to the image formation apparatus;
      the controller executes a first apparatus operation based on the first maintenance information transmitted from the cloud server and executes a second apparatus operation based on the second maintenance information transmitted from the cloud server;
      when the analyzer receives the apparatus information from a first image formation apparatus of the image formation apparatuses, the analyzer executes the first maintenance processing to the first image formation apparatus, then in a condition in which an execution result of the execution of the first maintenance processing is unsuccessful, the analyzer executes the second maintenance processing to the first image formation apparatus; and
      when the analyzer receives the apparatus information from a second image formation apparatus of the image formation apparatuses, the analyzer executes the second maintenance processing to the second image formation apparatus, then in a condition in which an execution result of the execution of the second maintenance processing is unsuccessful, the analyzer executes the first maintenance processing to the second image formation apparatus.

2. The network system according to claim 1, wherein each image formation apparatus is configured, when an event requiring maintenance occurs in the image formation apparatus, to transmit the apparatus information to the cloud server.

3. The network system according to claim 2, wherein the apparatus information includes identification information to identify the corresponding image formation apparatus, and
   the analyzer identifies the image formation apparatus from the identification information and the user information.

4. The network system according to claim 2, wherein the event requiring the maintenance is an event related to a name resolution in the network.

5. The network system according to claim 2, wherein each of the image formation apparatuses includes a read function of generating image data by reading an original, and
   the event requiring the maintenance is a failure in a storage of the image data into an information processor on the network.

6. The network system according to claim 2, wherein the image formation apparatus includes an operation unit; and
   when the operation unit acquires an operator input, the event requiring maintenance occurs in the image formation apparatus.

7. The network system according to claim 1, wherein the first maintenance processing comprises a Net BIOS Factor analysis.

8. The network system according to claim 7, wherein the Net BIOS Factor analysis comprises:
   extending, by the controller, a timeout time for facilitating receiving a name resolution for the first maintenance processing;
   determining by the controller if the extended timeout time facilitates the name resolution;
   increasing, by the controller in a condition in which the controller determines that the extended timeout time does not facilitate the name resolution, a number of retries for facilitating receiving the name resolution; and exiting the NetBIOS Factor analysis in a condition in which the controller determines that the extended timeout time does facilitate the name resolution;
   determining, by the controller, in the condition in which the controller determines that the extended timeout time does not facilitate the name resolution, whether the increased number of retries facilitates the name resolution;
   successively changing and retrying, by the controller in a condition in which the controller determines that the increased number of retries does not facilitate the name resolution, a text characteristic of the name for facilitating receiving the name resolution; and exiting the NetBIOS Factor analysis in a condition in which the controller determines that the increased number of retries does facilitate the name resolution.

9. The network system according to claim 1, wherein the second maintenance processing comprises a DNS server Factor analysis.

10. The network system according to claim 9, wherein the DNS Factor analysis comprises:
extending, by the controller, a timeout time for facilitating receiving a name resolution for the first maintenance processing;
determining by the controller if the extended timeout time facilitates the name resolution;
increasing, by the controller in a condition in which the controller determines that the extended timeout time does not facilitate the name resolution, a number of retries for facilitating receiving the name resolution; and exiting the DNS Factor analysis in a condition in which the controller determines that the extended timeout time does facilitate the name resolution;
determining, by the controller, in the condition in which the controller determines that the extended timeout time does not facilitate the name resolution, whether the increased number of retries facilitates the name resolution;
causing, by the controller in a condition in which the controller determines that the increased number of retries does not facilitate the name resolution, a display of a message; and exiting the DNS Factor analysis in a condition in which the controller determines that the increased number of retries does facilitate the name resolution.

11. The network system according to claim 1, wherein
the first image formation apparatus is connected to a small-scale network;
the second image formation apparatus is connected to a large-scale network;
the first maintenance processing comprises a Net BIOS Factor analysis; and
the second maintenance processing comprises a DNS server Factor analysis.

12. The network system according to claim 1, wherein
the cloud server includes relevant information storage that retains relevant information for relating image formation apparatus information and organization information for each of the image formation apparatuses;
the analyzer determines the organization of each of the image formation apparatuses based on the respective image formation apparatus information received from the image formation apparatus and the relevant information.

* * * * *